United States Patent [19]
Mandel

[11] 4,049,253
[45] Sept. 20, 1977

[54] TOE CLAMP

[76] Inventor: George I. Mandel, 4146 Krolop Road, Castro Valley, Calif. 94546

[21] Appl. No.: 745,042

[22] Filed: Nov. 26, 1976

[51] Int. Cl.² ............................................. B23Q 3/02
[52] U.S. Cl. ..................................................... 269/137
[58] Field of Search ................................. 269/134–138

[56] References Cited
U.S. PATENT DOCUMENTS

| 2,667,799 | 2/1954 | Rzepela | 269/138 |
| 2,760,535 | 8/1956 | Mertz | 269/137 |

Primary Examiner—Robert C. Watson
Attorney, Agent, or Firm—William R. Piper

[57] ABSTRACT

A toe clamp for a milling machine which comprises a T-nut slidable along an inverted T-shaped groove in the table top. A clamping screw is received in an inclined threaded bore in the T-nut for securing the nut in the groove. A work engaging member has a bore for receiving a shoulder bolt and the T-nut has a second threaded bore inclined at the same angle as the first threaded bore and receiving the threaded portion of the shoulder bolt. The work engaging member has a grooved edge for engaging with the edge of the work piece and the inclined shoulder bolt when tightened will force this grooved edge against the workpiece edge in an inwardly and downwardly direction for gripping it. The inclined clamping screw is received in a slot in the work engaging member to prevent it from rotating about the shoulder bolt.

3 Claims, 6 Drawing Figures

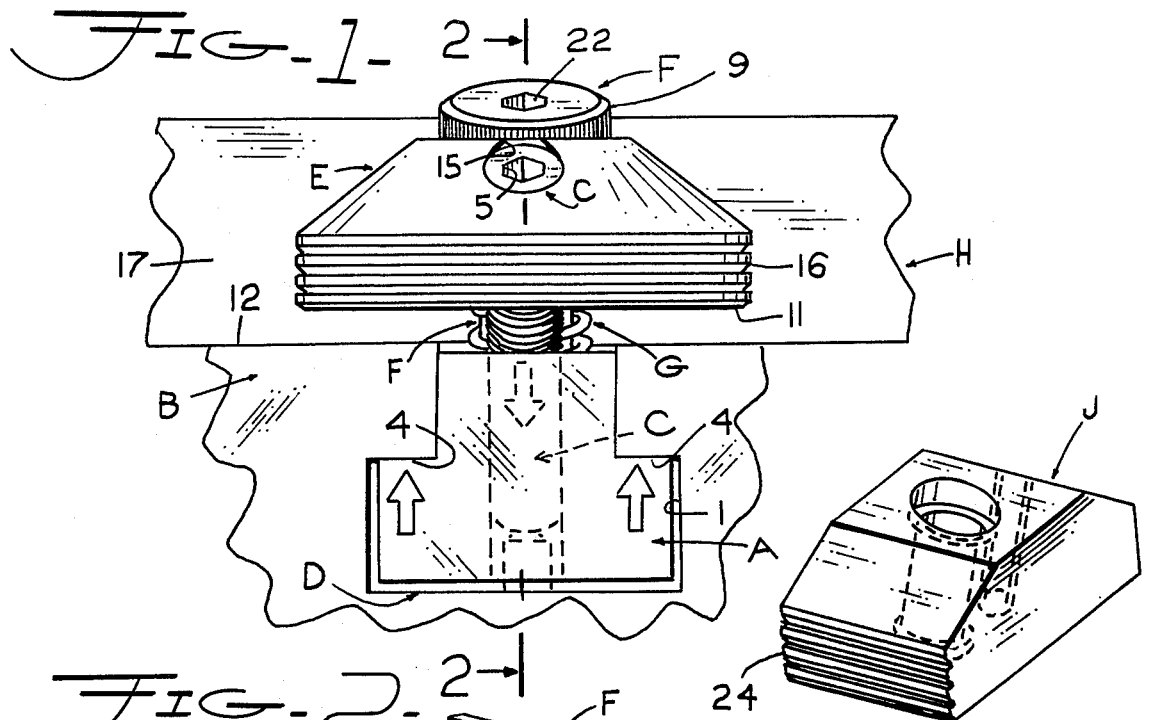
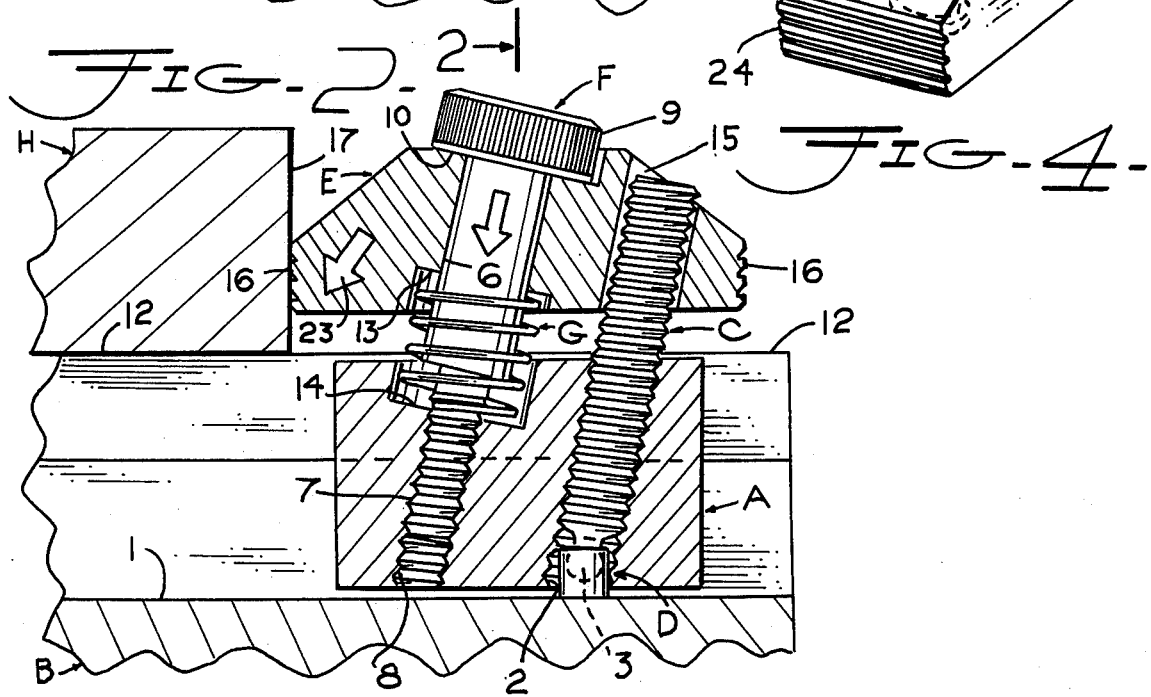
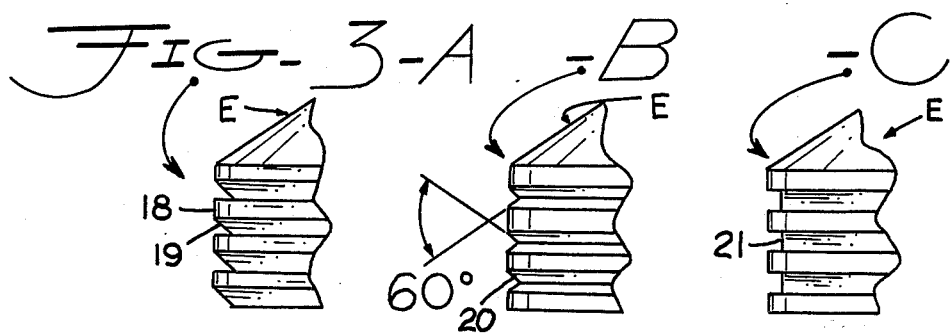

TOE CLAMP

SUMMARY OF THE INVENTION

The usual toe clamp for gripping the edge of a work piece on a milling machine table top has a work engaging member consisting of two parts, a body member and a toe piece. The bolt that secures the body member to the T-nut has its axis perpendicular to the plane of the table top. The toe piece rides in an inclined dove-tail groove in the body member and has a screw for moving the toe against the adjacent edge of the work piece.

My invention reduces the work engaging member to a single piece and thus eliminates the screw and dove-tail groove connection between the toe piece and the body member. This does away with the extra machine operations of forming the dove-tail groove in the main body and forming a dove-tail key in the toe piece. The inclining of the shoulder bolt in my toe clamp accomplishes the novel feature of moving a single piece, work engaging member against the adjacent edge of a work piece and at the same time moving the member in a downward direction. The contacting edge of the work engaging member with the work piece is ribbed with the edges of the ribs constituting "biting edges" that will move more effectively to grip the work piece.

BRIEF DESCRIPTION OF THE DRAWING

FIG. 1 is an end elevation of my toe clamp when assembled in a milling machine and with the work engaging member of the toe clamp contacting with the work piece.

FIG. 2 is a section taken along the line 2—2 of FIG. 1.

FIGS. 3A, B, and C illustrate different types of ribs formed on the edge of the work engaging member for contacting with the work piece.

FIG. 4 is a perspective view of a slightly modified form of the work engaging member.

DESCRIPTION OF THE PREFERRED EMBODIMENT

In carrying out my invention, I provide an inverted T-shaped nut A that is slidably received in an inverted T-shaped groove 1 provided in a table top B of a standard milling machine, see FIG. 1. The nut A has a threaded bore 2 whose axis is inclined from the vertical as clearly shown in FIG. 2. A clamping screw C is threaded into the bore 2 and it has a spherical head 3 at its lower end received in a recess in a swivel head D which in turn contacts with the bottom of the groove 1 so that a tightening of the screw will create a binding force between the nut and the shoulders 4 in the groove for securing the nut from moving.

The screw C has a recess 5 with a non-circular wall for receiving a wrench, not shown, for tightening or loosening the screw.

I further provide a work-engaging member E which is disc-shaped in FIGS. 1 and 2 and it has a bore 6 therein whose axis is inclined from the vertical and parallels the axis of the clamping screw C. A shoulder bolt F has a non-threaded portion receivable in the bore 6 in the work engaging member or clamp E. The lower end of the shoulder bolt F has a threaded portion 7 received in a threaded bore 8 in the nut A and inclined at the same angle as the threaded bore 2. The shoulder bore F has a knurled head 9 and the top of the work engaging member E has an inclined surface 10 which parallels the undersurface of the shoulder bolt head 9 so that the two can contact each other as shown in FIG. 2.

Yielding means is shown in FIG. 2 for holding the work engaging member E in contact with the shoulder bolt head 9. The underside 11 of the member E parallels the top 12 of the milling machine table B, and it has a circular recess 13 for receiving the upper end of a compression spring G. The lower end of the spring is received in a recess 14 provided in the top of the nut A. It will also be seen from FIG. 2 that the work engaging member E has an inclined bore 15 of a larger diameter than that of the clamping screw C for loosely receiving it. The screw C prevents any rotation of the member E about the shoulder bolt F.

FIG. 2 shows the rim of the work engaging member E provided with circular ribs 16 for contacting and gripping the adjacent edge 17 of a work piece H that rests on the table top 12. Different types of ribs or teeth are shown in modified forms of the member E in FIGS. 3—A, B, and C. FIG. 3-A shows annular ribs 18 in the member E and spaced apart by annular grooves 19 with downwardly inclined side walls for urging the work piece H, in a downward direction when the member E is moved against the edge 17 of the work piece. A V-shaped groove 20 is shown in FIG. B, in the member E and a groove 21, rectangular in cross section is shown in the member E in FIG. C for separating the annular ribs.

OPERATION

From the foregoing description of the various parts of the device, the operation thereof may be readily understood. In FIG. 2 I show the work piece H on the top 12 of the milling machine. The nut A has been moved so that the work engaging member E has its ribbed periphery 16 contacting the adjacent edge 17 of the work piece. The opposite edge, not shown, of the work piece may press against any type of stop member desired, none being shown, or another of my toe clamps may be used for their purpose.

The screw C is now tightened for securing the nut A from any further movement in the table top groove 1. A wrench, not shown, is next inserted into the non-circular recess 22 in the head 9 of the shoulder bolt F for forcing the edge 16 of the member E against the adjacent edge 17 of the work piece in a downwardly inclined direction as indicated by the arrow 23 in FIG. 2. The result is not only a gripping of the work piece H by the member E but also a downward pressure on the work piece to hold it firmly against the top 12 of the table B. The inclination of the axis of the shoulder bolt accomplishes this. the clamping screw C not only secures the nut A from moving in the groove 1, but also serves the additional function of preventing any rotation of the member E about the shoulder bolt F. This is accomplished by the upper portion of the clamping screw extending through the inclined bore 15 in the member E.

A slightly modified form of the work engaging member E is shown in FIG. 4. In this modified form the work engaging member J, is substantially rectangular in shape when looking at the top of the member. The ribbed edge 24 is linear rather than circular as is the edge 16 of the member E. The linear edge 24 will have its entire length contact the adjacent edge of the work piece H. In all other respects the member J is similar to the member E and no further detailed description need be given.

The work engaging member E has a circular periphery with the ribs 16 so as to be able to engage with work pieces H having irregular edges and can engage with a corner of a work piece.

I claim:

1. A toe clamp comprising:
   a. a nut slidable in an elongated groove in a milling machine table top, the groove having a cross section in the shape of an inverted T;
   b. a work engaging member having a bore downwardly inclined from the vertical and facing toward the adjacent edge of a work piece supported by the table top;
   c. a clamping screw having an upper portion received in said bore and a lower portion threaded into said nut, the head of said clamping screw moving said work engaging member downwardly and against the adjacent edge of the work piece when said clamping screw is tightened; and
   d. means for interconnecting said nut with said work engaging member and including a guide screw having its lower portion threaded into said nut and its upper portion received in an opening in said work engaging member that is slightly larger than the diameter of the guide screw, said guide screw's axis paralleling the inclined axis of said clamping screw.

2. The combination as set forth in claim 1; and in which
   a. said work engaging member having a circular ribber periphery that engages with the work piece.

3. The combination as set forth in claim 1: and in which
   a. the undersurface of said work engaging member paralelling the upper surface of the table top at all positions of said member toward or away from said nut.

* * * * *